(12) United States Patent
Wilhoit et al.

(10) Patent No.: US 7,404,999 B2
(45) Date of Patent: Jul. 29, 2008

(54) ANTI-BLOCKING BARRIER COMPOSITE

(75) Inventors: Darrel Loel Wilhoit, Washougal, WA (US); John Cameron Files, Vancouver, WA (US)

(73) Assignee: Graphic Packaging International, Inc., Marietta, GA (US)

( * ) Notice: Subject to any disclaimer, the term of this patent is extended or adjusted under 35 U.S.C. 154(b) by 491 days.

(21) Appl. No.: 11/092,435

(22) Filed: Mar. 29, 2005

(65) Prior Publication Data

US 2006/0068212 A1     Mar. 30, 2006

Related U.S. Application Data

(63) Continuation-in-part of application No. 10/954,435, filed on Sep. 30, 2004.

(51) Int. Cl.
*B32B 5/16* (2006.01)
*B32B 27/08* (2006.01)
*B32B 27/10* (2006.01)
*B32B 27/20* (2006.01)
*B32B 27/30* (2006.01)

(52) U.S. Cl. .............. 428/342; 428/323; 428/331; 428/340; 428/341; 428/446; 428/451; 428/452; 428/484.1; 428/485; 428/486; 428/500; 428/511; 428/514; 428/515; 428/520; 428/522; 427/402; 427/407.1; 427/411; 427/412.1; 427/412.4

(58) Field of Classification Search .............. None
See application file for complete search history.

(56) References Cited

U.S. PATENT DOCUMENTS

| | | | |
|---|---|---|---|
| 3,639,148 A | 2/1972 | Moore et al. | |
| 3,753,769 A | 8/1973 | Steiner | |
| 3,790,402 A * | 2/1974 | Eastes | 428/336 |
| 3,876,578 A | 4/1975 | Takada et al. | |
| 3,928,707 A | 12/1975 | Lauterbach et al. | |
| 3,950,290 A * | 4/1976 | Drury et al. | 524/276 |
| 3,988,500 A | 10/1976 | Jahn | |
| 4,058,645 A | 11/1977 | Steiner | |
| 4,058,649 A | 11/1977 | Steiner | |
| 4,097,297 A | 6/1978 | Keene | |
| 4,565,742 A | 1/1986 | Lang | |
| 4,654,252 A * | 3/1987 | Doyen | 428/213 |
| 4,794,136 A | 12/1988 | Touhsaent | |
| 4,830,902 A * | 5/1989 | Plantenga et al. | 428/207 |
| 4,867,844 A * | 9/1989 | Dessauer | 162/135 |
| 4,873,135 A | 10/1989 | Wittnebel et al. | |
| 4,902,594 A * | 2/1990 | Platzer | 430/14 |
| 4,977,032 A | 12/1990 | Grosjean | |
| 5,079,072 A | 1/1992 | Christopherson | |
| 5,225,288 A | 7/1993 | Beeson et al. | |

(Continued)

FOREIGN PATENT DOCUMENTS

DE     30 06 729 A1     9/1981

(Continued)

*Primary Examiner*—Vivian Chen
(74) *Attorney, Agent, or Firm*—Womble Carlyle Sandridge & Rice, PLLC

(57) ABSTRACT

A barrier paper has a polymeric layer substantially covering a first side of the paper and an anti-blocking coating on a second side. The polymeric layer has anti-blocking characteristics. A method of making an anti-blocking barrier paper also is provided.

20 Claims, 5 Drawing Sheets

U.S. PATENT DOCUMENTS

| | | | |
|---|---|---|---|
| 5,318,943 A | | 6/1994 | Ueno et al. |
| 5,475,080 A | * | 12/1995 | Gruber et al. ............... 528/354 |
| 5,654,039 A | * | 8/1997 | Wenzel et al. ............... 427/391 |
| 5,709,976 A | * | 1/1998 | Malhotra ............... 430/124.54 |
| 5,763,100 A | * | 6/1998 | Quick et al. ............... 428/486 |
| 5,770,301 A | | 6/1998 | Murai et al. |
| 5,773,131 A | | 6/1998 | Dettling |
| 5,837,383 A | * | 11/1998 | Wenzel et al. ............... 428/486 |
| 5,882,768 A | * | 3/1999 | Claytor ............... 428/143 |
| 5,902,846 A | * | 5/1999 | Feret et al. ............... 524/276 |
| 5,942,320 A | | 8/1999 | Miyake et al. |
| 5,989,724 A | * | 11/1999 | Wittosch et al. ............ 428/511 |
| 6,054,526 A | | 4/2000 | Betremieux et al. |
| 6,066,375 A | * | 5/2000 | Shanton ............... 428/35.7 |
| 6,132,822 A | * | 10/2000 | Overcash et al. ............ 428/34.2 |
| 6,156,387 A | * | 12/2000 | Werres et al. ............... 427/361 |
| 6,193,831 B1 | | 2/2001 | Overcash et al. |
| 6,218,024 B1 | | 4/2001 | Tamber et al. |
| 6,383,716 B1 | | 5/2002 | Oyoshi et al. |
| 6,852,399 B2 | * | 2/2005 | Takahashi et al. ........... 428/213 |
| 6,929,013 B2 | | 8/2005 | Ashcraft et al. |
| 6,942,907 B2 | | 9/2005 | Masuda et al. |
| 6,982,119 B2 | | 1/2006 | Shi et al. |
| 2003/0157354 A1 | | 8/2003 | Van Veghel et al. |
| 2004/0091585 A1 | * | 5/2004 | Theisen et al. ............... 426/124 |
| 2004/0105942 A1 | * | 6/2004 | Cable ............... 428/34.2 |
| 2006/0068182 A1 | * | 3/2006 | Wilhoit et al. ............... 428/213 |
| 2006/0068212 A1 | | 3/2006 | Wilhoit et al. |

FOREIGN PATENT DOCUMENTS

| | | | |
|---|---|---|---|
| EP | 0 376 560 | * | 7/1990 |
| EP | 0 466 124 | | 1/1992 |
| EP | 1 279 768 A2 | | 1/2003 |
| GB | 1 310 933 | | 3/1973 |
| GB | 2 060 655 | | 5/1981 |
| JP | 50-063021 | | 5/1975 |
| JP | 56-053069 | | 5/1981 |
| JP | 56-089552 | | 7/1981 |
| JP | 58145734 | | 8/1983 |
| JP | 04-270650 | | 9/1992 |
| JP | 07-070984 | * | 3/1995 |
| JP | 08-027398 | | 1/1996 |
| JP | 08-134406 | * | 5/1996 |
| JP | 09-291250 | | 11/1997 |
| WO | WO 97/15436 | | 5/1997 |
| WO | WO 2005/023945 A2 | | 3/2005 |

* cited by examiner

ANTI-BLOCKING BARRIER COMPOSITE

CROSS-REFERENCE TO RELATED APPLICATION

This application is a continuation-in-part of U.S. patent application Ser. No. 10/954,435, filed Sep. 30, 2004, which is incorporated by reference herein in its entirety.

FIELD OF THE INVENTION

This invention relates to multilayer composites suitable for use in packaging materials for various moisture and/or oxygen sensitive products, including food products and seed products, and methods of making such composites.

BACKGROUND OF THE INVENTION

Premium papers are bright, blade-coated papers used in high-end printing applications where multi-color pictures and lettering are applied. There is a great commercial interest in using premium papers to form packages for food products, agricultural products, such as seeds, and other items. However, such papers are prone to penetration by water vapor and oxygen.

Aqueous latexes of polyvinylidene chloride (PVdC) have been used to form moisture and oxygen barrier coatings for many years. Typically, the PVdC is coated onto a substrate and dried using infrared radiation, hot air, or a combination thereof. Often, two layers of PVdC are applied to the substrate to improve the barrier properties of the resulting composite. The composite typically is wound into a roll for later processing. A major drawback with the presently available PVdC coating processes is that, under certain circumstances, the PVdC tends to adhere to the other side of the substrate. Thus, the composite is prone to adhering to itself, or "blocking," when the roll is unwound.

In the case of premium papers, the side of the paper to be printed typically comprises a coating of inorganic particulates, such as clay, in a binder material, such as an acrylic latex. This side is referred to herein as the "printing" side, which may have a glossy finish, matte finish, or any other finish as desired. To form a barrier material, PVDC is applied to the other side of the paper, referred to herein as the "non-printing" side. When PVDC coated premium papers are dried and wound into a roll, the PVDC on the non-printing side tends to adhere to the printing side of the paper. As a result, the PVdC sometimes "picks" fibers from the printing side of the paper, thereby rendering it unsuitable for printing.

Thus, there remains a need for a method of forming a PVdC coated premium paper having barrier properties, and a roll of such premium paper, that is not prone to blocking.

SUMMARY OF THE INVENTION

The present invention relates generally to anti-blocking coatings for barrier materials and composites, anti-blocking barrier materials and composites, rolls of such barrier materials and composites, and methods for forming such materials and composites and rolls thereof.

In one aspect of the present invention, a barrier paper comprises a polymeric layer substantially covering a first side of the paper, the polymeric layer having anti-blocking characteristics, and an anti-blocking coating substantially covering a second side of the paper. The polymeric layer may comprise polyvinylidene chloride, ethylene vinyl alcohol, or polyvinyl alcohol, and further may comprise silica, a wax, or a combination thereof. In this and other aspects, the anti-blocking coating may comprise silica, a wax, or a combination thereof. The anti-blocking coating may overlie a print coating comprising inorganic particles in a binder.

In another aspect of the present invention, a composite having barrier properties is provided. The composite comprises a paper substrate having a first side and a second side, wherein the first side has a hold-out coating thereon and the second side has a print coating thereon, a barrier layer substantially overlying the hold-out coating and an anti-blocking coating substantially overlying the print coating. The anti-blocking coating may include colloidal silica in an amount of from about 0.001 lb/ream to about 1 lb/ream of the paper substrate.

In one variation of this aspect, the barrier layer has anti-blocking characteristics. The barrier layer may comprise polyvinylidene chloride or polyvinyl alcohol and an anti-blocking agent selected from the group consisting of silica, a wax, and a combination thereof. In another variation of this aspect, the composite further comprises an anti-blocking layer overlying the barrier layer. The anti-blocking layer may comprise a polymeric carrier material and an anti-blocking agent selected from the group consisting of silica, a wax, and a combination thereof.

According to another aspect of the present invention, a method of forming a barrier composite having reduced blocking is provided. The method includes providing a paper having a first side and a second side, forming a barrier layer on the first side of the paper, and applying an anti-blocking coating to the second side of the paper. The anti-blocking coating comprises silica, a wax, or a combination thereof.

The method also may comprise incorporating an anti-blocking agent into the barrier layer, wherein the anti-blocking agent comprises colloidal silica, a wax, or a combination thereof. The method further may comprise forming an anti-blocking layer over the barrier layer, wherein the anti-blocking layer comprises a polymeric material, and silica, a wax, or a combination thereof. The method still further may comprise applying a hold-out coating to the first side of the paper prior to forming the barrier layer. Additionally, the method further may comprise applying a print coating to the second side of the paper prior to applying the anti-blocking coating. Furthermore, the method of the present invention may comprise winding the barrier composite into a roll.

Other aspects, features, and advantages of the present invention will become apparent from the following description and accompanying figures.

DETAILED DESCRIPTION OF THE INVENTION

The present invention generally is directed to a barrier composite having reduced blocking properties (also termed an "anti-blocking barrier composite"). In one aspect, the present invention is directed to a paper having a barrier layer thereon, where the composite exhibits anti-blocking characteristics. In another aspect, the present invention is directed to a paper having a barrier layer formed from PVdC, where both sides of the paper are provided with anti-blocking characteristics.

Typically, PVdC coated substrates are wound into a roll for transportation and further processing. However, when PVdC is coated and dried onto the non-glossy side of glossy print papers, for example, and wound up, the composite is prone to damaging the printing surface upon unwinding the roll.

In one aspect, the present invention overcomes this obstacle by applying an anti-blocking coating to the printing side of the paper. In doing so, the ability to print on the coated surface and the quality of the printing is not adversely affected. The other side of the paper also may be provided with anti-blocking characteristics. In one aspect, an anti-blocking additive is incorporated into the barrier layer. In another aspect, an anti-blocking layer having anti-blocking characteristics is provided. In either case, when the composite is wound into a roll, the contacting surfaces each may have anti-blocking characteristics.

Barrier Composite

Figure 1:
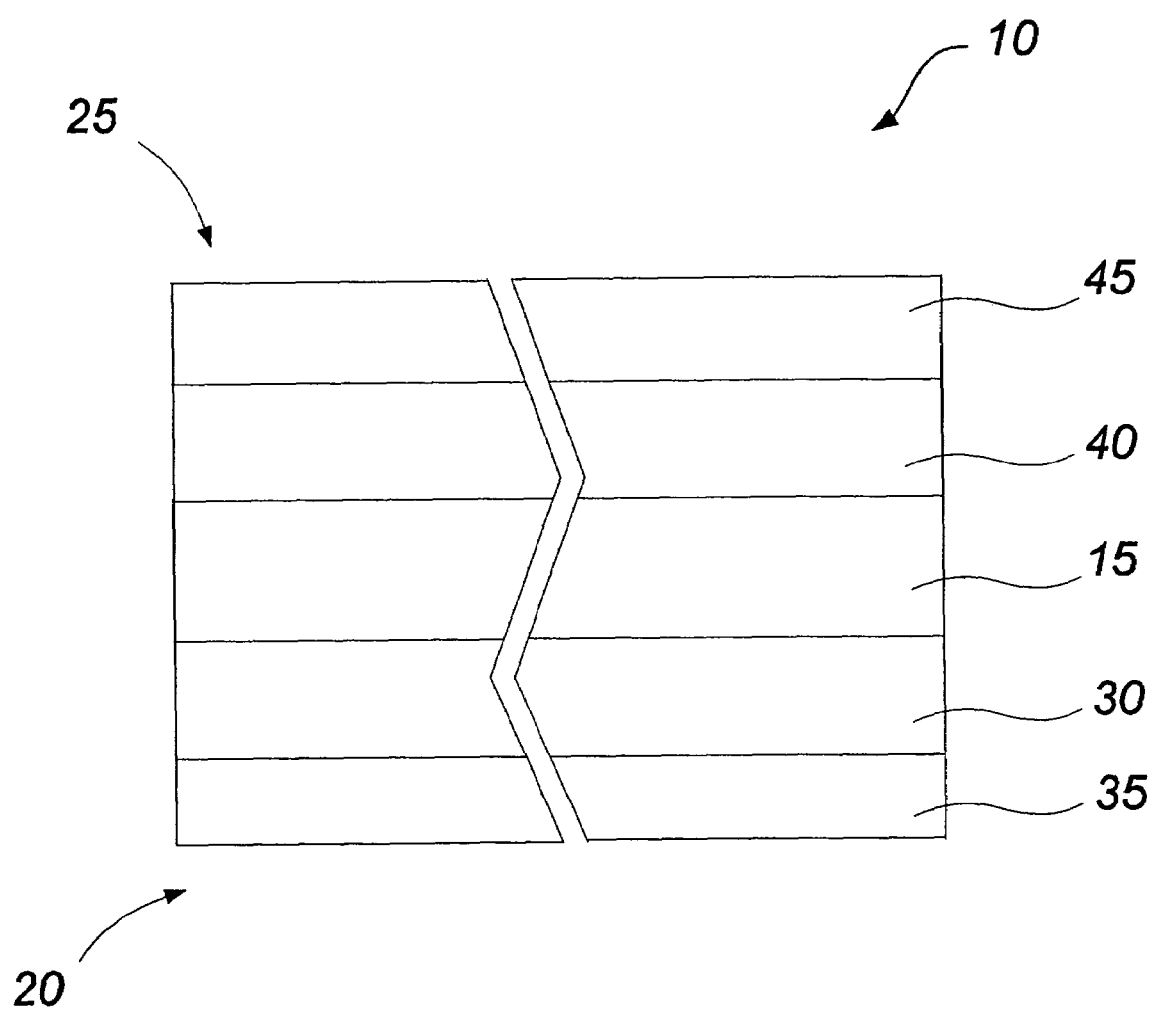
FIG. 1 depicts a cross-sectional view of an exemplary composite including a barrier layer having anti-blocking characteristics according to the present invention.

An exemplary barrier composite according to one aspect of the present invention is depicted in FIG. 1. The composite 10 includes a substrate 15 having a first, non-printing side 20 and a second, printing side 25. The first side 20 is provided with a hold-out coating 30 and a barrier layer 35 having anti-blocking characteristics. The second side 25 of the substrate 15 is provided with a print coating 40 and an anti-blocking coating 45.

Figure 2:
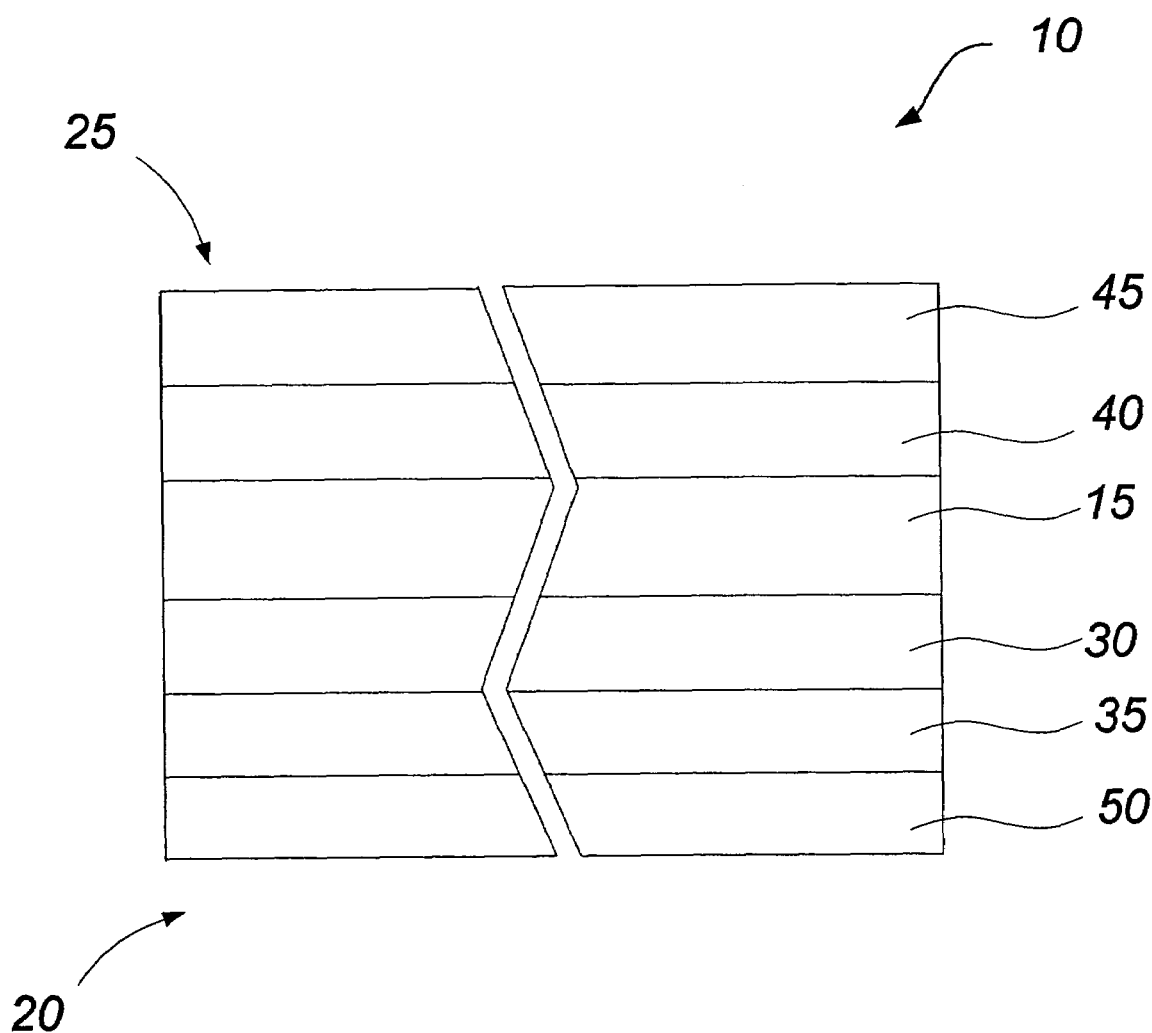
FIG. 2 depicts a cross-sectional view of an exemplary composite including a barrier layer and an anti-blocking layer according to the present invention.

Another aspect of the present invention is depicted in FIG. 2. The composite 10 includes a substrate 15 having a first, non-printing side 20 and a second, printing side 25. The first side 20 is provided with a hold-out coating 30 and a barrier layer 35. An anti-blocking layer 50 overlies the barrier layer 35. The second side 25 of the substrate 15 is provided with a print coating 40 and an anti-blocking coating 45.

In either aspect, when the composite 10 is wound into a roll, and the anti-blocking coating 45 is brought into contact with the barrier layer 35, the composite 10 will not stick to itself or "block" and will be readily unwound without being damaged.

According to the present invention, the substrate 15 comprises paper. For example, the paper is typically a blade-coated, unsized Kraft or sulphite paper having a basis weight of from about 7 lb/ream to about 100 lb/ream. As used herein, a "ream" refers to 3000 square feet. In another aspect, the substrate is a paper having a basis weight of from about 15 lbs/ream to about 60 lb/ream. The printing side 25 of the paper 15 typically is provided with a print coating 40 comprising a blend of inorganic particles in a binder that renders the surface suitable for printing, as is known to those of skill in the art.

The non-printing side 20 of the paper 15 typically is provided with a hold-out coating 30 that prevents the barrier layer coating from soaking into the porous paper. The hold-out coating generally is a film-forming aqueous dispersion that resides on the paper surface and inhibits subsequent aqueous layers from penetrating into the paper. Additionally, the hold-out coating provides a substantially even, sealed surface for receiving additional coatings or printing thereon. Typically, the hold-out coating is applied to the paper in an amount of from about 1 to about 12 dry lb/ream. In one aspect, the hold-out coating is applied in an amount of from about 3 to about 8 dry lb/ream. In another aspect, the hold-out coating is applied in an amount of from about 4 to about 6 dry lb/ream. For purposes of discussion herein, it is assumed that only the non-printing side of the paper is coated with a hold-out coating. However, it should be understood that the present invention contemplates use of various papers, including those having a hold-out coating on both sides of the paper. Additionally, it should be understood that although the term "non-printing" side is used herein, the present invention contemplates printing on one or both sides of the substrate, including the "non-printing" side. This term is used merely to provide a reference so that it is understood readily what portion or layer or component of the composite is being discussed or referred to.

Any hold-out coating may be used in accordance with the present invention, and ideally, a hold-out coating that provides a consistent, uniform surface upon which the barrier coating is used. Examples of hold-out coatings include, but are not limited to, latexes of flexible polymers, for example, AIR FLEX 460 ethylene vinyl acetate latex, commercially available from Air Products & Chemicals (Allentown, Pa.); starch and/or modified starches; polyvinylidene chloride, for example, DARAN 8730 polyvinylidene chloride, commercially available from W.R. Grace (Columbia, Md.), and DARAN SL112 polyvinylidene chloride (W.R. Grace); polyvinyl alcohol, for example, ELVANOL 50-42N PVOH commercially available from Dupont; and acrylic emulsions, for example, RHOPLEX HA12 acrylic emulsion, commercially available from Rohm & Haas (Philadelphia, Pa.) and ACRONAL NX 4533 acrylic copolymer emulsion, commercially available from BASF (Charlotte, N.C.). While such hold-out coatings are described in detail herein, it should be understood that various other hold-out coatings are contemplated by the present invention.

According to one aspect to the present invention, the non-printing side 20 of the paper 15 is provided with a barrier layer 35 over the hold-out coating 30. The barrier layer may be formed from any material, or combination or blend of materials, that suitably minimizes the transmission of water vapor, gaseous oxygen, and other vapors therethrough as required by a particular application. In one aspect, the barrier layer is formed from polyvinyl alcohol (PVOH). PVOH is commercially available from numerous sources, including Celanese, DuPont, and Kuraray. In another aspect, the barrier layer is formed from ethylene vinyl alcohol (EVOH). EVOH is commercially available, for example, from Eval Americas.

In another aspect, the barrier layer is formed from polyvinylidene chloride (PVdC). PVdC is a transparent and almost colorless thermoplastic noted for its extremely low permeability to gases. In the fields of food product packaging and seed packaging, PVdC is used to prevent the transmission of water vapor and oxygen into the package, which causes spoilage, and to prevent the transmission of desirable odors and flavors from the package.

PVdC typically is formed by polymerizing vinylidene chloride with about 10 to about 20 weight % monomers such as acrylic esters and unsaturated carboxyl groups. One commercially available PVdC that may be suitable for use with the present invention is DARAN 8730 from W.R. Grace (Columbia, Md.). DARAN 8730 is provided as a latex having about 53 weight % non-volatiles (NV). Another example of commercially available PVdC is DARAN 8600C, also available from W.R. Grace (Columbia, Md.). However, it should be understood that other barrier materials, and blends and combinations thereof, are contemplated by the present invention.

The barrier layer may be present in any suitable amount as needed or desired for a given application. For example, if the target water vapor transmission rate (WVTR) is 0.5 g H2O/100 sq in/day, the barrier layer, for example PVdC, may be present in an amount of from about 0.8 to about 1.6 lb/ream, for example, 1.2 lb/ream. If a WVTR value of 0.25 is required, the barrier layer may be present in an amount of from about 3 to about 5 lb/ream, for example, 4 lb/ream. If a WVTR value of 0.1 is required, the barrier layer may be present in an amount of from about 6 to about 8 lb/ream, for example, about 7 lb/ream. PVdC may be applied in an amount of about 20 lb/ream or higher; however, multiple applications of from about 6 to about 8 lb/ream per layer may be required. While various ranges and amounts are described in detail herein, it should be understood that other ranges and amounts not expressed herein are contemplated by the present invention.

According to another aspect of the present invention, anti-blocking characteristics are imparted to the non-printing side of the paper. In one aspect, the anti-blocking characteristics are imparted to the barrier layer by including one or more additives therein (FIG. 1). In another aspect, a separate anti-blocking layer having anti-blocking characteristics is provided over the barrier layer (FIG. 2). In either aspect, the wound composite does not block or pick when unwound.

Thus, in one aspect, an anti-blocking agent, such as silica, a wax, or a combination thereof, is added to the barrier layer. While not wishing to be bound by theory, it is believed that the silica and wax migrate to the surface of the barrier layer to create a "non-stick" surface. When the composite is wound into a roll, the non-stick surface of the barrier layer is in contact with the exposed anti-blocking coating on printing side of the paper, thereby preventing the composite from blocking as the roll is unwound.

One example of a silica that may be suitable for use with the present invention is SYLOJET 703A, commercially available from Grace Davison (Columbia, Md.). SYLOJET 703A is a silica gel believed to include silica particles having an average diameter of about 0.3 microns.

Where needed or desired, the silica may be provided as a colloidal silica. As used herein, "colloidal" refers to a substance including very tiny particles that are usually between 1 nanometer and 1000 nanometers in diameter. As used herein, a "colloidal dispersion" refers to a system in which particles of colloidal size are dispersed in a continuous medium, such as a liquid, solid, or gas. If desired, the colloidal silica may be provided in the form of a colloidal silica dispersion. Such colloidal silica dispersions may be provided with any solids content, for example, from about 40 to about 60 weight % colloidal silica. One such colloidal silica is LUDOX TM-50, commercially available from Grace Davison (Columbia, Md.), provided as an about 50 weight % NV dispersion in water. LUDOX TM-50 is believed to include silica particles having an average diameter of about 22 nanometers.

In general, any suitable wax may be selected for use with the present invention. As used herein, a "wax" refers to a low-melting organic mixture or compound of high molecular weight hydrocarbons, esters of fatty acids, and esters of alcohols that are solids at room temperature and generally similar in composition to fats and oils, except that no glycerides are present. One wax that may be suitable for use with the present invention is Carnauba wax. As used herein, "Carnauba wax" refers to the hard wax derived from the leaves of the Carnauba Palm, *Copernicia prunifera*. One example of a Carnauba wax that may be suitable for use with the present invention is MICHEMLUBE 160, commercially available from Michelman, Inc. (Cincinnati, Ohio). MICHEMLUBE 160 is provided as a 25 weight % NV emulsion.

The relative amounts of the components in the barrier layer may vary for each application. In one aspect, for 100 parts of dry barrier layer polymer, for example, PVdC, the barrier layer may include from about 0.25 to about 8 parts dry colloidal silica. In other instances, the barrier layer may include from about 0.5 to about 4 parts dry colloidal silica per 100 parts of dry barrier layer polymer. In yet other instances, the barrier layer may include about 1.6 part dry colloidal silica per 100 parts of dry barrier layer polymer.

For 100 parts of dry barrier layer polymer, the anti-blocking layer may include from about 0.25 to about 5 parts dry wax. In other instances, the barrier layer may include from about 0.5 to about 3 parts dry wax per 100 parts of dry barrier layer polymer. In yet other instances, the barrier layer may include about 0.8 part dry wax per 100 parts of dry barrier layer polymer.

In another aspect of the present invention, an anti-blocking layer overlies the barrier layer. The anti-blocking layer may be formed from a polymeric material, silica, for example, colloidal silica, and a wax, or any combination thereof. In this aspect, the polymeric material is used primarily as a carrier for the active anti-blocking components, namely, the colloidal silica and wax. As stated above, it is believed that the colloidal silica and wax migrate to the surface to create a "non-stick" surface. It is further believed that the application of heat to the composite during the formation process can facilitate the migration, or "blooming," of the silica and wax to the surface of the anti-blocking layer.

The carrier may be any polymeric material that has a chemical affinity for the barrier layer and that is capable of forming a continuous film. In one aspect, the polymeric material is PVdC. One example of a PVdC material that may be suitable as a carrier is DARAN 8730 PVdC latex (53% NV), commercially available from W.R. Grace (Columbia, Md.). However, other PVdC materials are commercially available and are contemplated hereby. Thus, in one aspect of the present invention, a first layer of PVdC may serve as the barrier layer, and a second layer of PVdC containing anti-blocking agents may serve as the anti-blocking layer.

For purposes of clarity, and not by way of limitation, it should be understood that where the polymeric carrier material is PVdC, and only a single layer of PVdC is provided, the layer may be termed the "barrier layer" or the "anti-blocking layer" and may provide both barrier and anti-blocking characteristics. Still further, it should be noted that although use of PVdC as the polymeric carrier material is discussed in detail herein, it should be understood that other polymeric materials can be used as desired.

As discussed previously, the colloidal silica may be provided in any suitable manner, for example, as an aqueous dispersion having, for example, about 50 weight % colloidal silica. The wax may be provided as an emulsion, and in some instances, may be a Carnauba wax emulsion. One example of a wax emulsion that may be suitable for use with the present invention is MICHEMLUBE 160 (containing 25% solids by weight), described in detail above.

The relative proportions of the components in the anti-blocking layer may vary for a given application. In some instances, for 100 parts of dry polymeric carrier material, the anti-blocking layer may include from about 0.25 to about 8 parts dry colloidal silica. In other instances, the anti-blocking layer may include from about 0.5 to about 4 parts dry colloidal silica per 100 parts of dry polymeric carrier material. In yet other instances, the anti-blocking layer may include about 1 part dry colloidal silica per 100 parts of dry polymeric carrier material.

In some instances, for 100 parts of dry polymeric carrier material, the anti-blocking layer may include from about 0.25 to about 5 parts dry wax. In other instances, the anti-blocking layer may include from about 0.5 to about 3 parts dry wax per 100 parts of dry polymeric carrier material. In yet other instances, the anti-blocking layer may include about 1 part dry wax per 100 parts of dry polymeric carrier material.

In this and other aspects of the present invention, the composition may be formed by diluting the polymeric carrier material with water as needed, followed by adding the wax and colloidal silica. Typically, the polymeric carrier material may be diluted to a composition containing from about 15 to about 40 weight % NV. A small amount of isopropyl alcohol (e.g., about 1 to about 5 weight %) may be added to reduce surface tension of the coating. Other additives, such as surfactants, anti-foaming agents, and the like may be added where needed or desired.

Returning to FIGS. 1 and 2, the printing side 25 typically is formed by coating the paper 15 with a print coating 40 comprising a blend of inorganic particles plus a binder, followed by various processing steps, such as drying and calendering. The print coating 40 renders the printing side 25 suitable for printing, or "print-friendly." The printing side 25 typically is coated as an ancillary step during the manufacture of the paper.

According still another aspect of the present invention, the printing side 25 of the paper 15 is provided with an anti-blocking coating 45. The anti-blocking coating may be any coating that imparts anti-blocking characteristics to the paper. In one aspect, the anti-blocking coating comprises silica, a wax, or a combination thereof. In another aspect, the anti-blocking coating comprises a dispersion of silica, wax, or a combination thereof in water. Examples of commercially available silica dispersions and waxes that may be suitable for use with the present invention are discussed above.

The silica and/or wax may be provided in any amount required to impart the desired anti-blocking characteristics. In one aspect, the colloidal silica is provided in an amount of from about 0.001 lb/ream to about 1 lb/ream. In another aspect, the colloidal silica is provided in an amount of from about 0.005 lb/ream to about 0.5 lb/ream. In yet another aspect, the colloidal silica is provided in an amount of from about 0.01 lb/ream to about 0.1 lb/ream. In still another aspect, the colloidal silica is provided in an amount of from about 0.015 lb/ream to about 0.3 lb/ream. In yet another aspect, the colloidal silica is provided in an amount of from about 0.025 lb/ream.

In one aspect, the wax is provided in an amount of from about 0.001 lb/ream to about 1 lb/ream. In another aspect, the wax is provided in an amount of from about 0.005 lb/ream to about 0.5 lb/ream. In yet another aspect, the wax is provided in an amount of from about 0.008 lb/ream to about 0.1 lb/ream. In still another aspect, the wax is provided in an amount of from about 0.01 lb/ream to about 0.05 lb/ream. In yet another aspect, the wax is provided in an amount of from about 0.0125 lb/ream. While various ranges and amounts are described herein, it should be understood that other ranges and amounts are contemplated by the present invention. Additionally, it should be understood that other layers are contemplated hereby.

Method of Preparing the Composite

Figure 3:
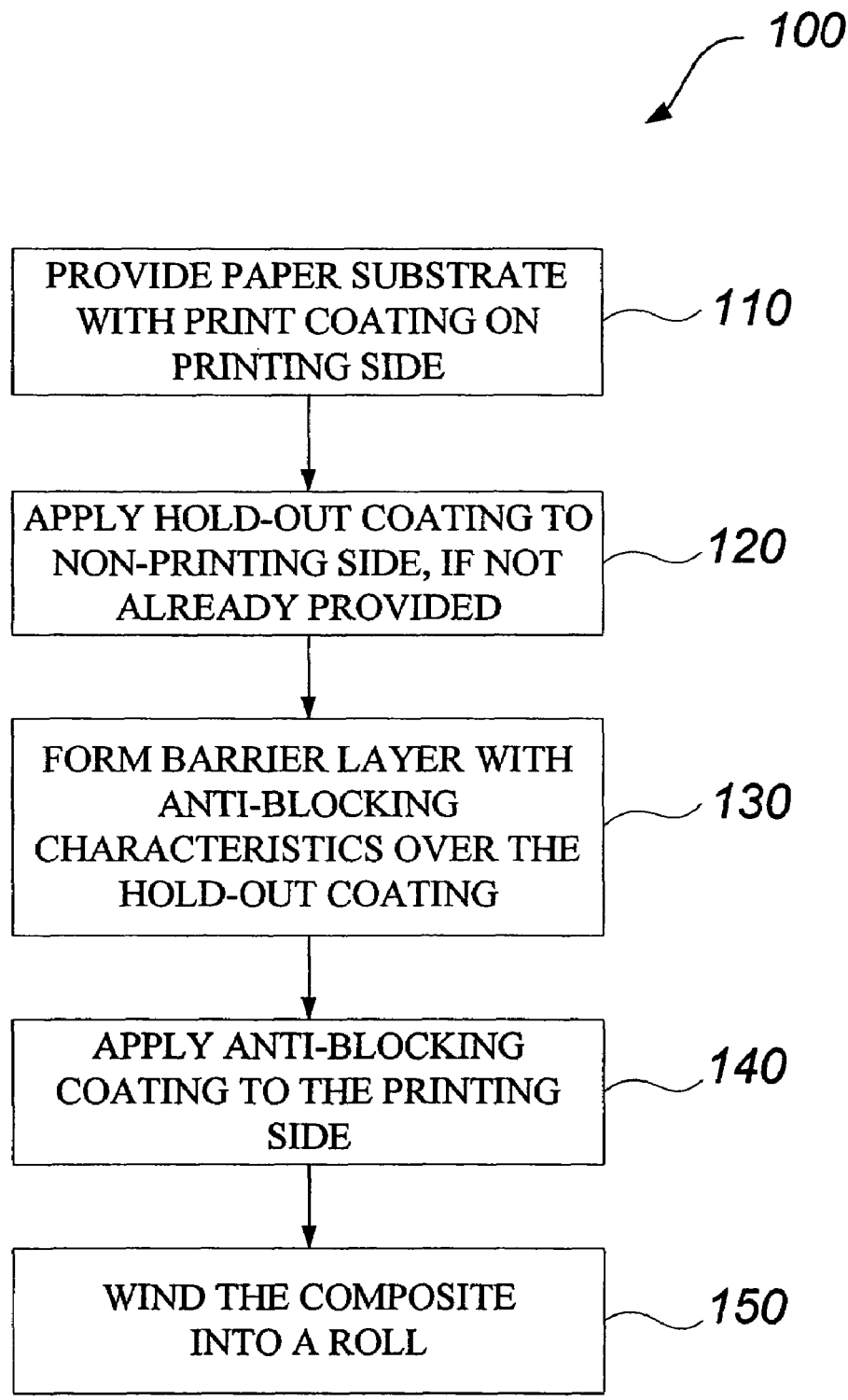
FIG. 3 presents an exemplary process for forming an exemplary composite including a barrier layer having anti-blocking characteristics according to the present invention.

The present invention also contemplates a method of forming a barrier composite having reduced blocking. More particularly, the present invention contemplates a method of forming a paper barrier composite having anti-blocking characteristics. The composite may be used for premium packaging or other high quality printing applications. In one aspect outlined in FIG. 3, the method 100 includes providing a paper substrate having a printing side and a non-printing side 110, applying a hold-out coating to the non-printing side 120, forming a barrier layer having anti-blocking characteristics over the hold-out coating 130, and applying an anti-blocking coating to the printing side of the paper 140. The composite then may be wound into a roll 150.

Figure 4:
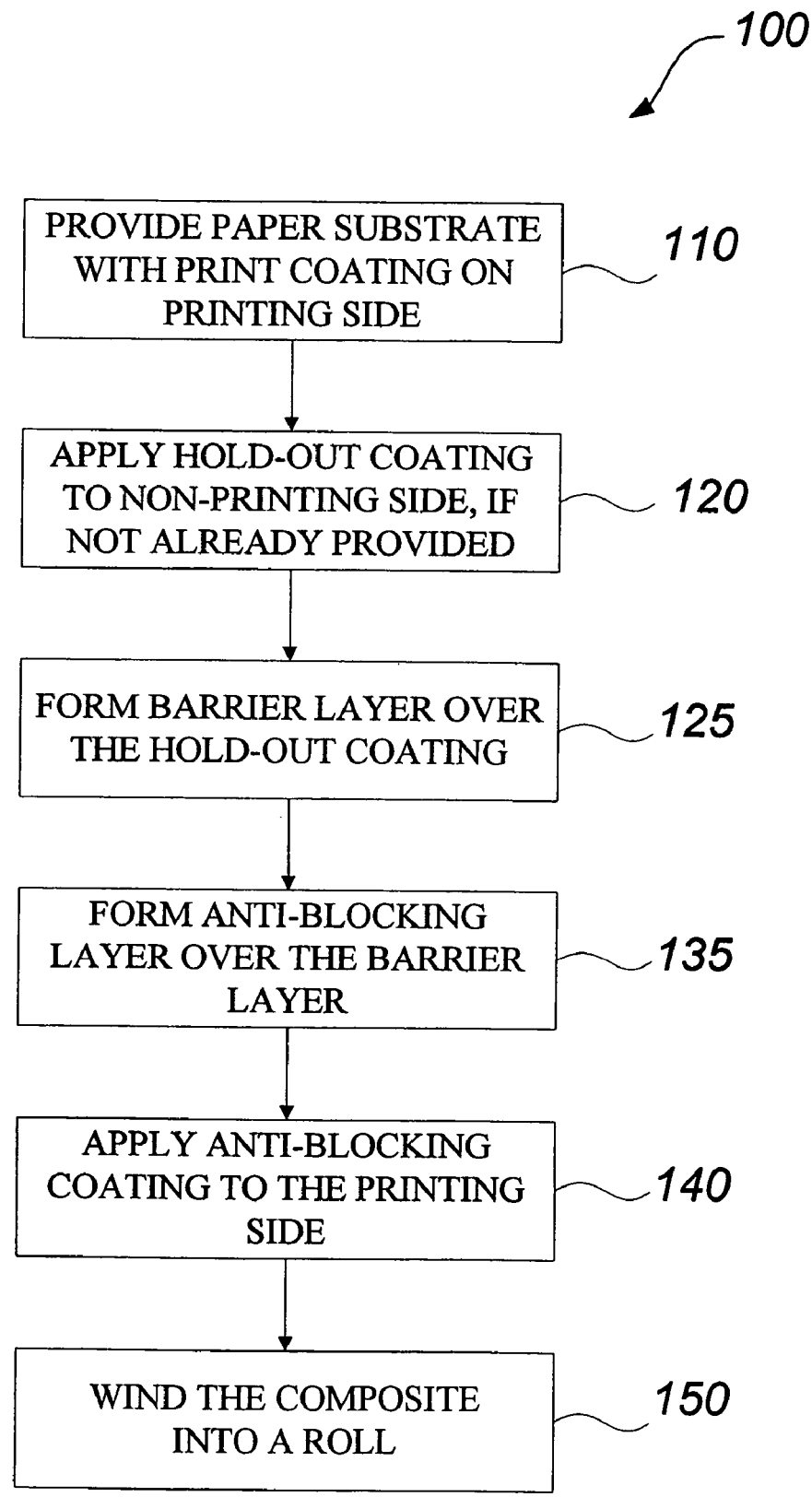
FIG. 4 presents an exemplary process for forming an exemplary composite including a barrier layer and an anti-blocking layer according to the present invention.

In another aspect outlined in FIG. 4, the method 100 includes providing a paper substrate having a printing side and a non-printing side 110, applying a hold-out coating to the non-printing side 120, forming a barrier layer over the hold-out coating 125, applying an anti-blocking layer over the barrier layer 135, and applying an anti-blocking coating to the printing side of the paper 140. The composite then may be wound into a roll 150. The details of an exemplary process are provided below. However, it should be understood that other means of preparing the composite are contemplated by the present invention.

The substrate typically is provided in a roll and unwound using traditional roll handling equipment. The substrate includes a first, non-printing side and a second, printing side. In the case of paper, the printing side is coated with a print coating as discussed above to render the surface suitable for printing. Typically, this coating is applied at the time of manufacture of the paper. The paper substrate then is subject to one or more coating and drying operations to form the various layers according to the present invention.

At a first coating station, a hold-out coating is applied to the non-printing side of the paper. Exemplary hold-out coatings are discussed above. The hold-out coating typically is selected to provide a continuous, uniform coating that is suitable for receiving additional layers thereon. The hold-out coating may be applied using a size press or other suitable equipment "on-machine," i.e., as part of the paper making process, or during a subsequent coating process "off-machine." For purposes of discussion herein, it is assumed that the non-printing side is supplied from the manufacturer without a hold-out coating and therefore must be coated "off-machine" prior to depositing the barrier layer on the paper.

At a second coating station, a barrier layer composition is applied over the hold-out coating to form a barrier layer. One exemplary barrier layer material is PVdC, discussed in detail above. In one aspect, the barrier layer composition includes additives, for example, silica, wax, or a combination thereof, that impart anti-blocking characteristics to the barrier layer. In another aspect discussed below, a separate anti-blocking layer is applied at a third coating station.

The barrier layer composition may be applied as a solution, dispersion, or emulsion. The barrier layer composition may be diluted, for example, with water, if needed to achieve the desired coating uniformity and to apply the desired coat weight. In some instances, the barrier layer composition may be applied as an aqueous coating having from about 15 to about 60 weight % NV. In other instances, the barrier layer composition may be applied as an aqueous coating having from about 30 to about 55 weight % NV. In yet other instances, the barrier layer composition may be applied as an aqueous coating having from about 40 to about 53 weight % NV. The barrier layer composition may be applied to the substrate using any suitable application equipment or technique, including but not limited to, Gravure coating, roll coating and air knife, brush treating, spraying, dipping, wire wound rods, and so forth.

The wet barrier layer composition then may dried by passing the coated substrate through a hot air impingement dryer or other suitable dryer. The dryer temperature is adjusted to impart sufficient thermal energy to the coating to substantially evaporate the water, or other liquid dispersant, from the barrier layer coating and obtain a substantially solid film. Additionally, the dryer temperature must be maintained at a temperature that will not cause the substrate to deform. For example, where the substrate is paper, the dryer air temperature may be maintained at from about 250° F. to about 400° F., for example at 300° F., to achieve a web temperature of from about 200° F. to about 250° F. The fan pressure may be maintained at from about 1 to about 2 inches $H_2O$, which corresponds to an air velocity of from about 4500 to about 6500 feet per minute. The residence time within the dryer depends on the length of the dryer and the line speed at which the coated substrate is prepared. For example, where the dryer is about 60 feet in length and the line speed ranges from about 500 feet per min to about 1000 feet per min, the residence time within the dryer may be from about 7.2 to about 3.6 seconds, respectively. Other line speeds and residence times are contemplated by the present invention.

As stated above, a separate anti-blocking layer composition may be applied in a third, tandem coating and drying operation as an alternative to including an anti-blocking agent in the barrier layer. The anti-blocking layer is formed from a polymeric material and an anti-blocking agent, for example, colloidal silica, wax, or a combination thereof. In one aspect, the anti-blocking layer is formed from PVdC, a wax, and colloidal silica. The anti-blocking layer may be applied to the barrier layer as a solution, dispersion, or emulsion. The anti-blocking layer composition may be applied to the barrier layer using any suitable application equipment or technique, including but not limited to, Gravure coating, roll coating and air knife, brush treating, spraying, dipping, wire wound rods, and so forth.

The anti-blocking layer then may be dried by passing the composite through a hot air impingement dryer or other suitable dryer. As above, the dryer temperature is adjusted to impart sufficient thermal energy to substantially evaporate the water, or other liquid dispersant, and obtain a substantially solid film. Additionally, the dryer air temperature must be maintained at a temperature that will not cause the substrate to deform. For example, where the substrate is paper, the dryer air temperature may be maintained at from about 250° F. to about 400° F., for example at 300° F., to achieve a web temperature of from about 200° F. to about 250° F. The fan pressure may be maintained at from about 1 to about 2 inches $H_2O$, which corresponds to an air velocity of from about 4500 to about 6500 feet per minute. The residence time within the dryer depends on the length of the dryer and the line speed at which the composite is prepared. For example, where the dryer is about 20 feet in length and the line speed ranges from about 500 feet per min to about 1000 feet per min, the residence time within the dryer may be from about 2.4 to about 1.2 seconds, respectively. Other residence times are contemplated by the present invention.

At a final coating station, an anti-blocking coating is applied to the second, printing side of the paper. The coating comprises silica and, optionally, a wax, in a suitable medium, for example, water. Exemplary silica additives and waxes are discussed in detail above. The coating may be applied using any suitable application equipment or technique, including but not limited to, Gravure coating, roll coating and air knife, brush treating, spraying, dipping, wire wound rods, and so forth. For example, the anti-blocking coating applied over the print coating may be applied using a Dalghren roll coater, or using any other application technique as needed or desired. In doing so, the moisture level in the paper may increase from about 3% to about 5%, or higher, which helps to alleviate curl in the paper. While it is believed that no drying is necessary, an additional drying step is contemplated by the present invention.

Figure 5:
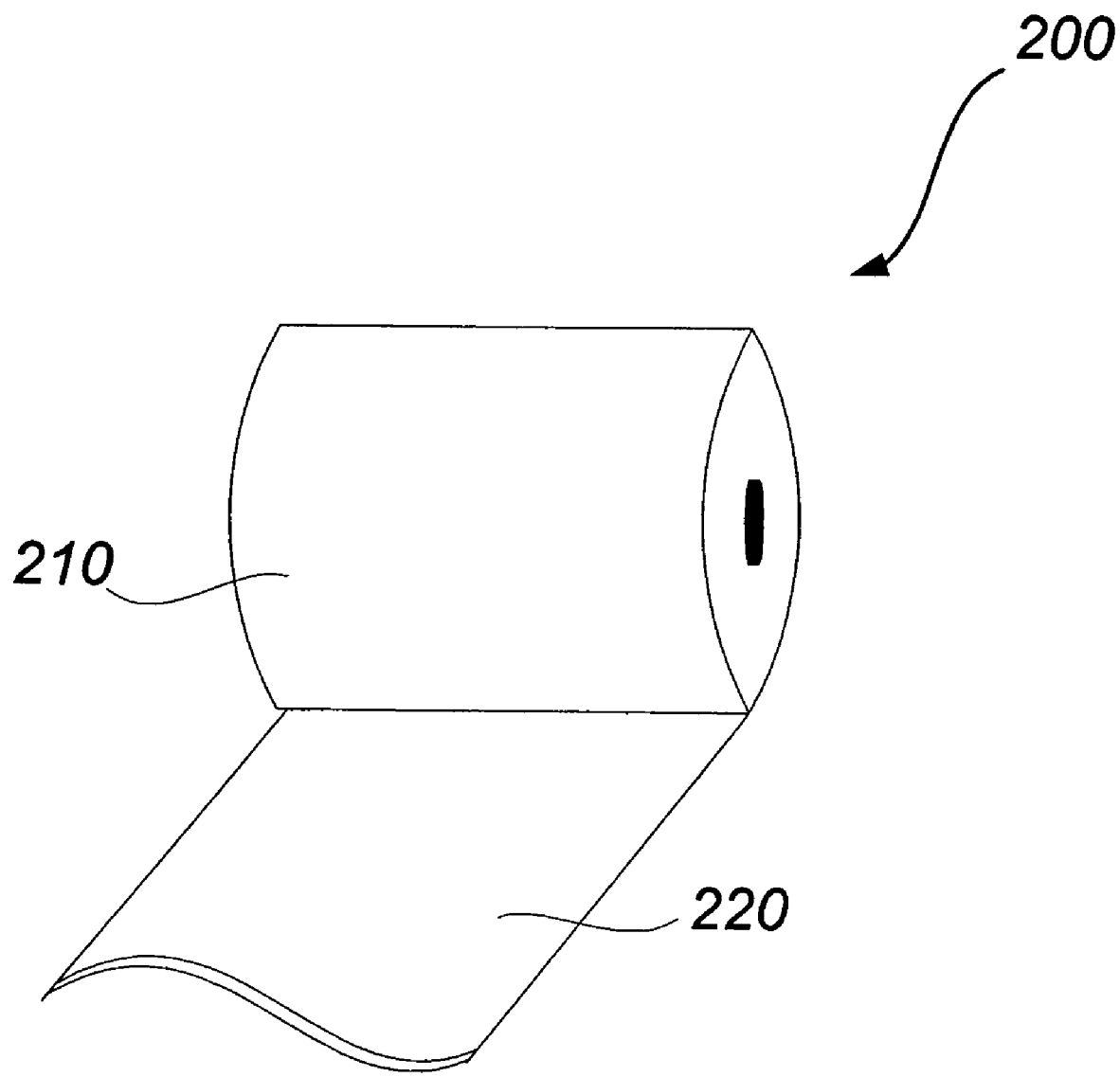
FIG. 5 depicts an exemplary barrier composite wound into a roll.

The resulting product typically is wound into a roll using a surface winder, center winder, or other suitable winding equipment. As illustrated in FIG. 5, the exposed, contacting surfaces 210 and 220, each having anti-blocking characteristics, of the roll 200 of composite readily wind and unwind without picking or blocking. Notably, the anti-blocking barrier composite of the present invention may be wound and unwound readily on both surface winders and center winders without blocking. Thus, the present invention enables greater flexibility in equipment selection and processing speeds.

The present invention is illustrated further by the following examples, which are not to be construed in any way as imposing limitations upon the scope thereof. On the contrary, it is to be clearly understood that resort may be had to various other aspects, modifications, and equivalents thereof which, after reading the description herein, may be suggested to one of ordinary skill in the art without departing from the spirit of the present invention or the scope of the appended claims.

TEST METHODS

All measurements of water vapor transmission rate (WVTR) were made using ASTM F 1249-90(Reapproved 1995) titled "Water Vapor Transmission Rate Through Plastic Film and Sheeting Using a Modulated Infrared Sensor," incorporated by reference herein in its entirety.

All measurements of oxygen transmission rate (OTR) were made using ASTM F 1927-98 titled "Determination of Oxygen Gas Transmission Rate, Permeability and Permeance at Controlled Relative Humidity Through Barrier Materials Using a Coulometric Detector," incorporated by reference herein in its entirety.

The methylene blue pinhole test is conducted as follows. A solution containing 30 grams of methylene blue dye in 1 gallon of methyl alcohol is prepared. The solution is spread with a brush on the coated side of the sample and permitted to dry for about 1 minute. After one minute, the sample is folded in half for evaluation. The number of blue spots (pinholes) is counted per square foot across the entire web and reported.

EXAMPLE 1

Laboratory equipment was used to prepare anti-blocking composites from various glossy, bladed-coated papers. First, various hold-out coatings were applied using laboratory, wire wound, draw-down rods. The materials evaluated were DARAN SL112 polyvinylidene chloride (W.R. Grace), DARAN 8730 polyvinylidene chloride (W.R. Grace), ELVANOL 50-42N PVOH (Dupont), ACRONAL NX4533 acrylic latex (BASF), AIRFLEX 460 EVA latex (Air Products & Chemicals), and B-15R acrylic latex (Rohm & Haas). After coating and drying, the composites were evaluated for continuity and the presence of pinholes using methylene blue pinhole test.

Next, DARAN 8730 was combined with about 1 to about 2% MICHEMLUBE 160 wax (Michelman, Inc.) and LUDOX TM-50 silica (Grace Davison) (based on the weight of the DARAN 8730) to form the barrier layer with anti-blocking characteristics. After coating and drying, the composites again were evaluated for continuity and the presence of pinholes using methylene blue pinhole test. Additionally, WVTR and OTR were measured.

Finally, an anti-blocking coating containing silica and wax was applied to the second, glossy side of the paper using a #3 wire wound rod. The coating contained 5% LUDOX TM-50 silica and 5% MICHEMLUBE 160 wax in water. The anti-blocking characteristics of the composite were evaluated. The results are presented in Table 1.

As is evident from the data presented, the hold-out coating may be important for obtaining target barrier properties in the finished product. In this experiment, the BASF acrylic latex, ACRONAL NX4533 provided the most continuous hold-out coating and prevented the formation of pinholes in the PVdC barrier layer. As regards the barrier layer, the addition of the silica and wax emulsions appears not to interfere with the barrier functions of the PVdC after it is applied and dried.

TABLE 2

| Sample | 9 | 10 | 11 | 12 |
|---|---|---|---|---|
| Stora Enso paper, #/ream | 40 | 40 | 40 | 40 |
| Hold-out coating, on non-glossy side, dry lbs/ream | 6 | 6 | 6 | 6 |
| Barrier plus anti-block chemicals, dry lbs/ream | 5 | 5 | 5 | 5 |
| Composition of anti-block mix applied to glossy side: | | | | |
| Water (wt %) | 90 | 90 | 95 | 95 |
| MICHEMLUBE 160 (wt %) | 5 | 5 | 0 | 0 |

TABLE 1

| Sample | 1 | 2 | 3 | 4 | 5 | 6 | 7 | 8 |
|---|---|---|---|---|---|---|---|---|
| 1st Layer applied to non-glossy side | 54% SL112 | 53% 8730 | ELVANOL 50-42N | PVOH & 8730 | ACRONAL NX4533 | ACRONAL NX4533 | AIRFLEX 460 | B-15R |
| % Solids as provided | 54 | 53 | 100 | 100% PVOH 53% 8730 | 50 | 50 | 63 | 46 |
| Paper | 43# Stora Enso | 40# Stora Enso | 40# Stora Enso | 40# Stora Enso | 34# Dunn | 34# Dunn | 34# Dunn | 40# Stora Enso |
| Solids in coating % | 54 | 53 | 7 | 1.3% Elv 51-05 25% 8730 | 41 | 40.7 | 53.5 | 46 |
| Mayer rod | #20 | #20 | #20 | #20 | #10 | #10 | #10 | #10 |
| Dry lb/ream | 9 | 9 | 1 | 6 | 6 | 6 | 6 | 6 |
| Pinholes number/sq in | Penetrates entirely | Penetrates entirely | 10-20 Mudcracking | 100 | 0 | 0 | 0 | 0 |
| 2nd layer applied to non-glossy side | 45% 8730 3.0% TM50 1.5% M160 | 46% 8730 1.5% TM50 1.5% M160 | 46% 8730 1.5% TM50 1.5% M160 | 46% 8730 1.5% TM50 1.5% M160 | 46% 8730 1.5% TM50 1.5% M160 | 46% 8730 1.5% TM50 1.5% M160 | 46% 8730 1.5% TM50 1.5% M160 | 46% 8730 1.5% TM50 1.5% M160 |
| Wt of dry PVdC, lb/ream | 5.0 | 5.0 | 5.0 | 5.0 | 6.0 | 6 | 6 | 5 |
| Pinholes after PVdC coat number/sq in | Excessive | Excessive | 20-30 | 0 | 0 | 0 | 0 | 0 |
| WVTR (g/100 in$^2$/24 hours) | Too high | Too High | Not tested | 0.8 | Not tested | 0.24 | 0.433 | Too high |
| OTR (in$^2$/24 hours) | Out of range | Out of range | Out of range | 402 | Not tested | Not tested | Not tested | Out of range |
| Anti-blocking coating? | No | No | No | Yes | Yes | No | No | Yes |
| Anti-blocking results | Notable blocking | Ticking | Slight Ticking | No blocking | No Blocking | Not tested | Not tested | No Blocking |

EXAMPLE 2

Various anti-blocking agents and coatings were evaluated by applying appropriate the coatings to both the glossy side and the non-glossy side of 40# Stora Enso paper.

About 6 dry lbs/ream of hold-out coating containing about 1.3% ELVANOL 51-05 PVOH and about 25% DARAN 8730 was applied to the non-glossy side of the paper and dried. The barrier layer composition then was applied in an amount of about 5 dry lbs/ream over the hold-out coating. The barrier layer composition contained about 5 lb/ream of DARAN 8730, about 0.1 lb/ream of Ludox TM-50 and about 0.05 lbs/ream of Michemlube 160.

As an anti-blocking coating for the print side of the paper, silica and/or wax was mixed with water to form a stable coating and applied using a #3 wire wound rod to the glossy coat side of the 40# Stora Enso paper. As indicated in Table 2, each of the composites exhibited anti-blocking characteristics.

TABLE 2-continued

| Sample | 9 | 10 | 11 | 12 |
|---|---|---|---|---|
| LUDOX TM-50 (wt %) | 5 | 0 | 5 | 0 |
| SYLOJET 703A (wt %) | 0 | 5 | 0 | 5 |
| Total anti-blocking coating on glossy coat (lbs/ream) | 0.0375 | 0.0225 | 0.025 | 0.010 |
| Results | No blocking | No Blocking | No Blocking | No Blocking |

EXAMPLE 3

Various barrier composites were prepared using a commercial scale C&L coater and dryer. The process conditions and the results are presented in Table 3.

The substrate used was a 40 lb/ream or 35 lb/ream Stora Enso print paper. The paper was blade coated on one side with a glossy clay coat, and starch coated on the paper machine on the other, dull side.

On a two-station coater, the samples of Stora Enso first were coated with a PVdC hold-out coating and dried. Next, an anti-blocking barrier layer composition was applied over the hold-out coating to form the barrier layer. The barrier layer then was dried. Finally, an anti-blocking coating was applied to the glossy, blade-coated side of the substrate using a Dahlgren roll coater.

TABLE 3

| Sample | 13 | 14 | 15 |
|---|---|---|---|
| Stora Enso paper (wt) | 40# | 35# | 35# |
| Hold-out coating (wet basis) | 30% 8730 10% 51-05 | 53% 8730 | 53% 8730 |
| Hold-out coat wt (dry lb/ream) | 3.8 | 8.3 | 8 |
| Methylene blue pinhole test | 100% penetration | 100% penetration | 100% penetration |
| Anti-blocking barrier layer coating (wet basis) | 46% 8730 1.5% TM50 1.5% M160 | 46% 8730 1.5% TM50 1.5% M160 | 46% 8730 1% 703A 1% M160 |
| PVdC coat wt (dry lb/ream) | 6.5 | 5 | 5 |
| Total coat wt (dry lb/ream) | 10.3 | 13.3 | 13.0 |
| Drying line speed (ft/min) | 500 | 500 | 500 |
| Tmp Ross | 370 | 370 | 370 |
| Tmp TEC | 380 | 380 | 380 |
| Dahlgren speed % | 50 | 50 | 70 |
| Anti-blocking coating applied to the dry glossy coat | 5% TM-50 5% M160 | 5% TM-50 5% M160 | 5% 703A |
| Final barrier properties; methylene blue pinhole test | Excessive pinholes | Excessive pinholes | Excessive pinholes |
| Blocking results | No blocking | No blocking | Slight blocking |

The methylene blue pinhole tests indicate that the hold-out coating was not sufficient in this instance. Nonetheless, it is evident from the data presented above that the process described herein and in accordance with the present invention can be successfully used to prepare composites from premium papers that have anti-blocking characteristics.

EXAMPLE 4

Various barrier composites were prepared using a commercial scale C&L coater and dryer. The process conditions and the results are presented in Table 4.

A 34#/ream Dunn Ultra II paper provided with a glossy clay coat blade-coated on one side and a dull starch coating on the other side was used as the substrate.

At a first coating station, a hold-out coating was applied in the event that the Dunn paper did not have adequate hold-out characteristics. DARAN 8730 PVdC, ACRONAL NX 4533 acrylic latex, and AIRFLEX 460 ethylene vinyl acetate (EVA) latex were used, as indicated in Table 4. At a second coating station, an anti-blocking barrier layer was applied over the hold-out coating and dried.

Next, 0.025 dry lb/ream of LUDOX TM-50 and 0.0125 dry lb/ream of MICHEMLUBE 160 were applied to the glossy, blade-coated side of the Dunn paper using a Dahlgren roll coater. The application of the anti-blocking coating increased the moisture content of the web from about 3% to about 5%.

TABLE 4

| Sample | 16 | 17 | 18 |
|---|---|---|---|
| Dunn Ultra II paper (wt) | 34# | 34# | 34# |
| Hold-out coating (wet basis) | 53% 8730 | 42% Acronal NX 4533 | 46% Airflex 460 |
| Hold-out coat wt (dry lb/ream) | 6 | 4.5 | 6. |

TABLE 4-continued

| Sample | 16 | 17 | 18 |
|---|---|---|---|
| Anti-blocking barrier layer coating (wet basis) | 46% 8730 1.5% TM50 1.5% M160 | 46% 8730 1.5% TM50 1.5% M160 | 46% 8730 1.5% TM50 1.5% M160 |
| PVdC coat wt (dry lb/ream) | 5.0 | 5.0 | 5.0 |
| Total coat wt (dry lb/ream) | 11 | 9.5 | 11 |
| Line speed (ft/min) | 500 | 500 | 500 |
| Tmp Ross | 320 | 320 | 320 |
| Tmp TEC | 280 | 280 | 280 |
| Dahlgren speed % | 50 | 50 | 50 |
| Anti-blocking compounds applied to the dry print coat | 5% TM-50 5% M-160 90% water | 5% TM-50 5% M-160 90% water | 5% TM-50 5% M-160 90% water |
| WVTR (g/100 in$^2$/24 hours) | 0.098 | 0.28 | 0.35 |
| Blocking results | No blocking | No blocking | Ticking |

Based on the data presented above, the process described herein and in accordance with the present invention can be successfully used to prepare composites from premium papers that have anti-blocking barrier characteristics. Sample 16 exhibited superior barrier properties, as evidenced by a WVTR of 0.098. This is likely due to the use of two layers of PVdC in the composite. Both Sample 16 and Sample 17 exhibited no blocking. In contrast, Sample 18 exhibited ticking. It is not clear why Sample 18 did not perform as expected.

Accordingly, it will be readily understood by those persons skilled in the art that, in view of the above detailed description of the invention, the present invention is susceptible of broad utility and application. Many methods, embodiments, and adaptations of the present invention other than those herein described, as well as many variations, modifications, and equivalent arrangements will be apparent from or reasonably suggested by the present invention and the above detailed description thereof, without departing from the substance or scope of the present invention. Accordingly, while the present invention is described herein in detail in relation to specific aspects, it is to be understood that this detailed description is only illustrative and exemplary of the present invention and is made merely for purposes of providing a full and enabling disclosure of the present invention. The detailed description set forth herein is not intended nor is to be construed to limit the present invention or otherwise to exclude any such other embodiments, adaptations, variations, modifications, and equivalent arrangements of the present invention, the present invention being limited solely by the claims appended hereto and the equivalents thereof.

What is claimed is:

1. A composite comprising:
   (a) a paper substrate having a first side and a second side, wherein the first side has a hold-out coating thereon and the second side has a print coating thereon;
   (b) a barrier layer overlying the hold-out coating; and
   (c) an anti-blocking coating overlying the print coating, wherein the anti-blocking coating at least partially defines an outermost surface on the second side of the composite, wherein the anti-blocking coating consists essentially of colloidal silica and, optionally, wax.

2. The composite of claim 1, wherein the anti-blocking coating consists essentially of colloidal silica in an amount of from about 0.001 lb/ream to about 1 lb/ream of the paper substrate.

3. The composite of claim 1, wherein the barrier layer has anti-blocking characteristics.

4. The composite of claim 3, wherein the barrier layer comprises:
   polyvinylidene chloride, ethylene vinyl alcohol, or polyvinyl alcohol; and
   an anti-blocking agent selected from the group consisting of colloidal silica, a wax, and any combination of colloidal silica and a wax.

5. The composite of claim 1, further comprising an anti-blocking layer overlying the barrier layer.

6. The composite of claim 5, wherein the anti-blocking layer overlying the barrier layer comprises a polymeric carrier material and an anti-blocking agent selected from the group consisting of colloidal silica, a wax, and any combination of colloidal silica and a wax.

7. The composite of claim 6, wherein the polymeric carrier material comprises polyvinylidene chloride.

8. A method of forming a barrier composite comprising:
   (a) providing a paper having a first side and a second side;
   (b) forming a barrier layer on the first side of the paper; and
   (c) applying an anti-blocking coating to the second side of the paper, the anti-blocking coating consisting essentially of colloidal silica and, optionally, a wax.

9. The method of claim 8, further comprising incorporating an anti-blocking agent into the barrier layer, wherein the anti-blocking agent comprises colloidal silica, a wax, or any combination of colloidal silica and a wax.

10. The method of claim 8, further comprising forming an anti-blocking layer over the barrier layer, wherein the anti-blocking layer comprises:
    a polymeric material; and
    colloidal silica, a wax, or any combination of colloidal silica and a wax.

11. The method of claim 8, further comprising applying a hold-out coating to the first side of the paper prior to forming the barrier layer.

12. The method of claim 8, further comprising applying a print coating to the second side of the paper prior to applying the anti-blocking coating.

13. The method of claim 8, further comprising winding the barrier composite into a roll.

14. A composite comprising:
    a substrate having a first side and a second side;
    a polymer layer overlying the first side of the substrate, the polymer layer comprising a polymer selected from the group consisting of polyvinylidene chloride, ethylene vinyl alcohol, and polyvinyl alcohol; and
    an anti-blocking layer overlying the second side of the substrate, the second anti-blocking layer consisting essentially of colloidal silica and, optionally, a wax, wherein
       the composite has a pair of opposite, outermost surfaces, and
       each of the outermost surfaces has anti-blocking characteristics.

15. The composite of claim 14, wherein the polymer layer further comprises an anti-blocking agent selected from the group consisting of colloidal silica, wax, and any combination of colloidal silica and wax.

16. The composite of claim 14, wherein
    the anti-blocking layer is a first anti-blocking layer, and
    the composite further comprises a second anti-blocking layer overlying the polymer layer, such that the polymer layer is disposed between the second anti-blocking layer and the substrate.

17. The composite of claim 16, wherein the second anti-blocking layer comprises
    a polymeric material selected from the group consisting of polyvinylidene chloride. ethylene vinyl alcohol, and polyvinyl alcohol, and
    an anti-blocking agent selected from the group consisting of colloidal silica, a wax, and any combination thereof.

18. The composite of claim 16, wherein the first anti-blocking layer and the second anti-blocking layer each at least partially define respective outermost surfaces of the composite.

19. The composite of claim 14, further comprising
    a hold-out coating overlying the first side of the substrate, such that the hold-out coating is disposed between the polymer layer and the substrate; and
    a print coating overlying the second side of the substrate, such that the print coating is disposed between the anti-blocking layer and the substrate.

20. A composite comprising:
    a paper substrate having a first side and a second side opposite the first side;
    a substantially continuous polymer layer overlying the first side of the paper substrate, the polymer layer comprising a polymer selected from the group consisting of polyvinylidene chloride, ethylene vinyl alcohol, and polyvinyl alcohol;
    a first anti-blocking layer overlying the substantially continuous polymer layer such that the substantially continuous polymer layer is disposed between the first anti-blocking layer and the paper substrate, wherein
       the first anti-blocking layer is an outermost layer on the first side of the composite, and
       the first anti-blocking layer comprises
          polyvinylidene chloride, and
          colloidal silica, wax, or any combination of colloidal silica and wax;
    a print coating overlying the second side of the paper, the print coating comprising inorganic particles in a binder; and
    a second anti-blocking layer overlying the print coating such that the print coating is disposed between the second anti-blocking layer and the paper substrate, wherein
       the second anti-blocking layer is an outermost layer on the second side of the composite, and
       the second anti-blocking layer consists essentially of colloidal silica and, optionally, a wax.

* * * * *